(12) United States Patent
Baba

(10) Patent No.: US 12,218,376 B2
(45) Date of Patent: Feb. 4, 2025

(54) BATTERY PACK

(71) Applicant: Prime Planet Energy & Solutions, Inc., Tokyo (JP)

(72) Inventor: Yasunori Baba, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 77 days.

(21) Appl. No.: 17/673,797

(22) Filed: Feb. 17, 2022

(65) Prior Publication Data

US 2022/0263190 A1 Aug. 18, 2022

(30) Foreign Application Priority Data

Feb. 18, 2021 (JP) ................................. 2021-024243

(51) Int. Cl.
*H01M 50/30* (2021.01)
*H01M 50/124* (2021.01)
(Continued)

(52) U.S. Cl.
CPC ......... *H01M 50/30* (2021.01); *H01M 50/124* (2021.01); *H01M 50/183* (2021.01); *H01M 50/3425* (2021.01); *H01M 2220/20* (2013.01)

(58) Field of Classification Search
CPC ........... H01M 50/3425; H01M 50/342; H01M 50/124; H01M 50/183; H01M 50/30;
(Continued)

(56) References Cited

U.S. PATENT DOCUMENTS

2008/0171259 A1 7/2008 Kanai et al.
2018/0053976 A1* 2/2018 Park .................. H01M 4/13
(Continued)

FOREIGN PATENT DOCUMENTS

CN 1961438 A 5/2007
CN 111066175 A 4/2020
(Continued)

OTHER PUBLICATIONS

English translation of KR20140139793A; Secondary battery comprising two electrode lead detachable from each other; Dec. 8, 2014; LG Chemical LTD (Year: 2014).*
(Continued)

*Primary Examiner* — Matthew T Martin
*Assistant Examiner* — Adam J Francis
(74) *Attorney, Agent, or Firm* — HAUPTMAN HAM, LLP

(57) ABSTRACT

A battery pack includes a module. The module includes one or more cell pairs. Each of the one or more cell pairs includes a first cell and a second cell. The first cell includes an exterior package, an electrode assembly, and an electrode terminal. The electrode terminal includes a first main surface and a second main surface. The first main surface is oriented in a direction of the second cell. A sealing portion is formed at a peripheral edge of the exterior package. The sealing portion includes a first region, a second region, and a third region. The first region is formed between the first main surface and the resin layer. The second region is formed between the second main surface and the resin layer. The third region is formed between portions of the resin layer. The second region includes a fracture promoting portion.

18 Claims, 15 Drawing Sheets

(51) Int. Cl.
   *H01M 50/183* (2021.01)
   *H01M 50/342* (2021.01)
(58) Field of Classification Search
   CPC ............. H01M 50/105; H01M 50/178; H01M 50/186; H01M 50/193; H01M 50/197; H01M 50/198; H01M 50/211; H01M 50/557; H01M 2220/20; H01M 10/0525; H01M 50/375
   See application file for complete search history.

(56) References Cited

U.S. PATENT DOCUMENTS

| | | | |
|---|---|---|---|
| 2019/0198845 | A1 | 6/2019 | Bae et al. |
| 2019/0372083 | A1 | 12/2019 | Ryu et al. |
| 2020/0358045 | A1 | 11/2020 | Minami et al. |

FOREIGN PATENT DOCUMENTS

| | | | | | |
|---|---|---|---|---|---|
| CN | 111193000 | A | * | 5/2020 | ........ H01M 50/3425 |
| JP | 2000208112 | A | * | 7/2000 | |
| JP | 2001093489 | A | * | 4/2001 | |
| JP | 2001148234 | A | | 5/2001 | |
| JP | 2001-283800 | A | | 10/2001 | |
| JP | 2003346768 | A | | 12/2003 | |
| JP | 2005322434 | A | * | 11/2005 | |
| JP | 2008091240 | A | * | 4/2008 | |
| JP | 4920812 | B2 | | 4/2012 | |
| JP | 2013-051121 | A | | 3/2013 | |
| JP | 2020-509549 | A | | 3/2020 | |
| JP | 2020-064881 | A | † | 4/2020 | |
| JP | 2021-504896 | A | | 2/2021 | |
| KR | 20140139793 | A | * | 12/2014 | |

OTHER PUBLICATIONS

English Translation of JP 2008091240 A—Battery; Apr. 17, 2008; GS Yuasa Corp; (Year: 2008).*

English Translation of CN111193000A—Bus bar for a battery module and battery Module; Samsung SDI Co LTD; May 22, 2020 (Year: 2020).*

\* cited by examiner
† cited by third party

FIG.16

| | POSITIONS OF ROUGH SURFACE PORTIONS | POSITION OF FRACTURE PROMOTING PORTION | SERIES OF HEAT GENERATION EVENTS |
|---|---|---|---|
| No.1 | | SECOND REGION (13b) | NOT OCCURRED |
| No.2 | | NOT PROVIDED | OCCURRED |
| No.3 | | FIRST REGION (13a) | OCCURRED |
| No.4 | | NOT PROVIDED | OCCURRED |

BATTERY PACK

This nonprovisional application is based on Japanese Patent Application No. 2021-024243 filed on Feb. 18, 2021, with the Japan Patent Office, the entire contents of which are hereby incorporated by reference.

BACKGROUND OF THE INVENTION

Field of the Invention

The present technology relates to a battery pack.

Description of the Background Art

Japanese Patent Laying-Open No. 2003-346768 discloses a laminate cell.

SUMMARY OF THE INVENTION

A laminate film has been used as an exterior package of a single-cell (cell). The laminate film includes a resin layer and a metal layer. The resin layer covers the metal layer. The laminate film is processed into a pouch, for example. A sealing portion is formed by welding the resin layer at a peripheral edge of the pouch. By forming the sealing portion, the exterior package is sealed. Such a cell including an exterior package composed of a laminate film is also referred to as "laminate cell".

Two or more cells are electrically connected to form a module. In the module, the two or more cells can form a serial circuit or a parallel circuit. One or more such modules form a battery pack.

It is considered that an abnormality may occur in one cell of the module. For example, it is considered that an internal short circuit may occur in one cell. The internal short circuit can cause an increased temperature of the cell. Further, gas can be generated inside the cell. Due to at least one of increased temperature and increased internal pressure, the sealing portion of the exterior package can be fractured. With the fracture of the sealing portion, the gas can be issued from the exterior package.

In the conventional laminate cell, the sealing portion can be fractured at random positions. For example, gas can be issued to a position at which the gas is likely to be accumulated between adjacent cells. The gas can have a high temperature. Due to the accumulation of the gas having a high temperature, an adjacent cell can be heated, thus resulting in a series of abnormalities.

An object of the present technology is to provide a battery pack in which a series of abnormalities of cells are less likely to occur.

Hereinafter, configurations and advantages of the present technology will be described. However, a mechanism of action in the present specification includes a presumption. The mechanism of action does not limit the scope of the present technology.

[1] A battery pack includes a module. The module includes one or more cell pairs. Each of the one or more cell pairs includes a first cell and a second cell. The second cell is adjacent to the first cell. The second cell is electrically connected to the first cell.

The first cell includes an exterior package, an electrode assembly, and an electrode terminal. The exterior package includes a laminate film. The laminate film includes a resin layer and a metal layer. The resin layer covers the metal layer. The resin layer includes a first thermoplastic resin. The exterior package stores the electrode assembly. A sealing portion is formed at a peripheral edge of the exterior package. The electrode terminal is connected to the electrode assembly. The electrode terminal extends through the sealing portion and is drawn from inside of the exterior package to outside of the exterior package.

The electrode terminal has a flat plate shape. The electrode terminal includes a first main surface and a second main surface. The first main surface is oriented in a direction of the second cell. The second main surface is a surface opposite to the first main surface.

The sealing portion includes a first region, a second region, and a third region. The first region is formed between the first main surface and the resin layer. The second region is formed between the second main surface and the resin layer. The third region is formed between portions of the resin layer.

The second region includes a fracture promoting portion. The fracture promoting portion is configured to be more likely to be fractured than the first region and the third region when at least one of temperature and internal pressure of the first cell is increased.

The module of the present technology include two or more laminate cells. The two laminate cells constitute the cell pair. The cell pair includes the first cell (also simply referred to as "cell") and the second cell (also referred to as "adjacent cell"). The cell pair form a series circuit or a parallel circuit.

The sealing portion of the cell can be divided into the first region, the second region, and the third region in accordance with a relation with the electrode terminal. The second region includes the fracture promoting portion. The fracture promoting portion functions as an explosion-proof valve. That is, the fracture promoting portion is more likely to be fractured than the first region and the third region when an abnormality occurs. When the fracture promoting portion is fractured, gas is issued from the fracture promoting portion. Since the gas is issued from a position inside the second region, it is expected that a series of abnormalities of cells are less likely to occur.

FIG. 1 is a schematic diagram showing a flow of gas when the gas is issued from the first region.

An electrode terminal 30a of a first cell 100a and an electrode terminal 30b of a second cell 100b (adjacent cell) are electrically connected to each other. Electrode terminal 30a may be directly connected to electrode terminal 30b. A bus bar 150 may connect electrode terminal 30a and electrode terminal 30b to each other. Electrode terminal 30a and electrode terminal 30b are connected to each other to form a locally closed space. A first region 13a faces the adjacent cell. If gas is issued from first region 13a when an abnormality occurs, it is considered that the gas is likely to flow in a direction of the adjacent cell. Also, it is considered that the gas is likely to be accumulated in the closed space. When the adjacent cell is heated, the abnormality having occurred may cause another abnormality in the adjacent cell.

FIG. 2 is a schematic diagram showing a flow of gas when the gas is issued from the third region.

Gas issued from a third region 13c is likely to be diffused in multiple directions. Due to the diffusion of the gas in the multiple directions, a plurality of cells may be heated. Further, it is considered that the gas issued from third region 13c is likely to flow toward a storage portion for the electrode assembly. This may result in a series of abnormalities in the plurality of cells.

FIG. 3 is a schematic diagram showing a flow of gas when the gas is issued from the second region.

A second region 13b is located opposite to first region 13a. The locally closed space is formed on the first region 13a side by the connection between electrode terminal 30a and electrode terminal 30b. On the other hand, no space is closed on the second region 13b side. It is considered that the gas issued from second region 13b is likely to flow in one direction. This is presumably because the space on the first region 13a side is closed. Further, since the space on the second region 13b side is not closed, it is considered that the gas is less likely to be accumulated. Further, it is considered that the gas issued from second region 13b is likely to flow in a direction to be separated away from the storage portion for electrode assembly 20. Therefore, it is expected that a series of abnormalities in cells are less likely to occur when the gas is issued from second region 13b.

[2] In the battery pack according to [1], the first main surface may include a rough surface portion, for example.

In the rough surface portion, an anchor effect can occur. The anchor effect may cause an increased bonding strength. Since the first region includes the rough surface portion, the first region may have a bonding strength higher than that of the second region. That is, the second region has a relatively low bonding strength. Since the second region has such a relatively low bonding strength, the fracture promoting portion can be formed in the second region. The fracture promoting portion is expected to be fractured when internal pressure is increased, for example.

[3] In the battery pack according to [1] or [2], the fracture promoting portion may include a second thermoplastic resin. The second thermoplastic resin has a melting point lower than a melting point of the first thermoplastic resin.

When the temperature is increased, the second thermoplastic resin can be softened prior to the first thermoplastic resin. The fracture promoting portion including the second thermoplastic resin is expected to be fractured when the temperature is increased, for example.

[4] The battery pack according to any one of [1] to [3] may further include a container, for example. The container stores the module. An exhaust duct is formed inside the container. The fracture promoting portion is disposed inside the exhaust duct.

In the present technology, it is expected that gas is issued from the fracture promoting portion when an abnormality occurs. Since the fracture promoting portion is disposed inside the exhaust duct, the gas issued from the fracture promoting portion can be smoothly ejected to the outside of the container.

[5] The module may include a plurality of the cell pairs, for example. In each of the plurality of the cell pairs, the fracture promoting portion may be disposed inside the exhaust duct.

When the battery pack includes the plurality of fracture promoting portions, the exhaust duct may be disposed such that each of the fracture promoting portions is disposed inside the exhaust duct.

The foregoing and other objects, features, aspects and advantages of the present technology will become more apparent from the following detailed description of the present technology when taken in conjunction with the accompanying drawings.

BRIEF DESCRIPTION OF THE DRAWINGS

FIG. 16 shows a configuration of each sample and a result of nail penetration test.

DESCRIPTION OF THE PREFERRED EMBODIMENTS

Figure 1:
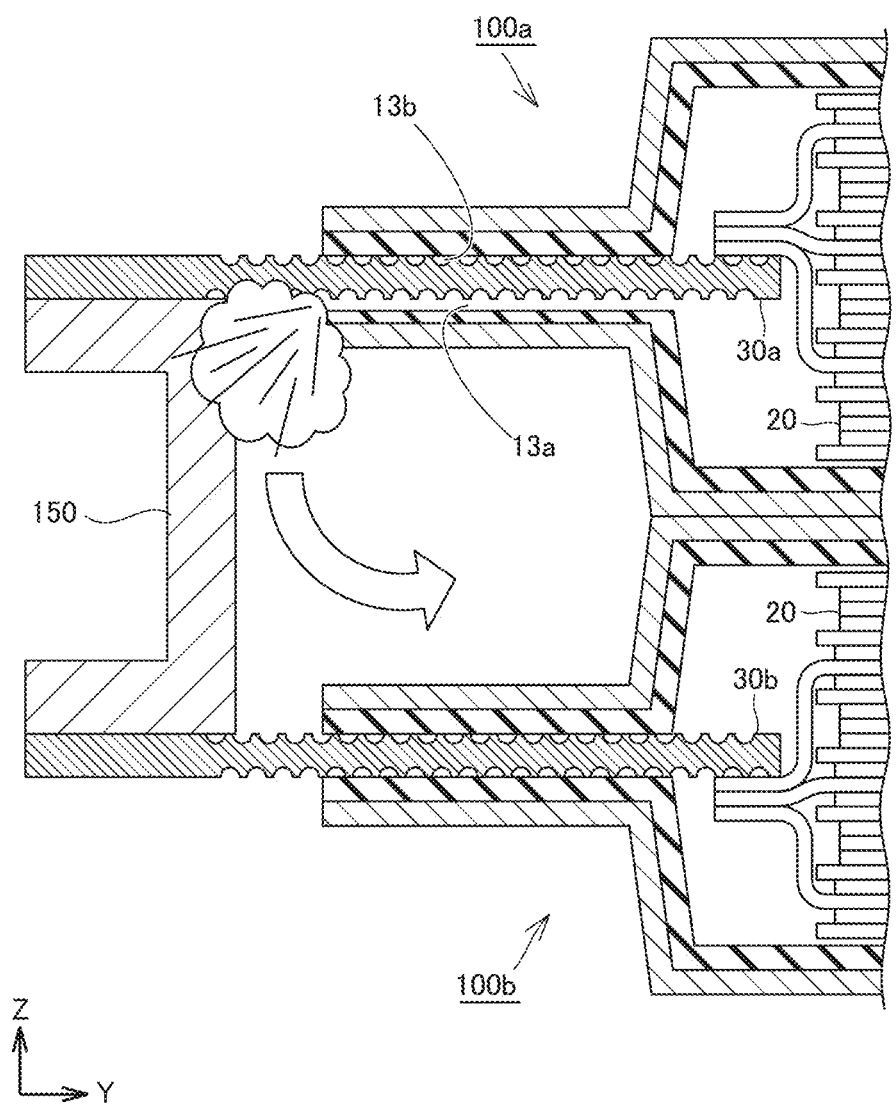
FIG. 1 is a schematic diagram showing a flow of gas when the gas is issued from a first region.
Figure 2:
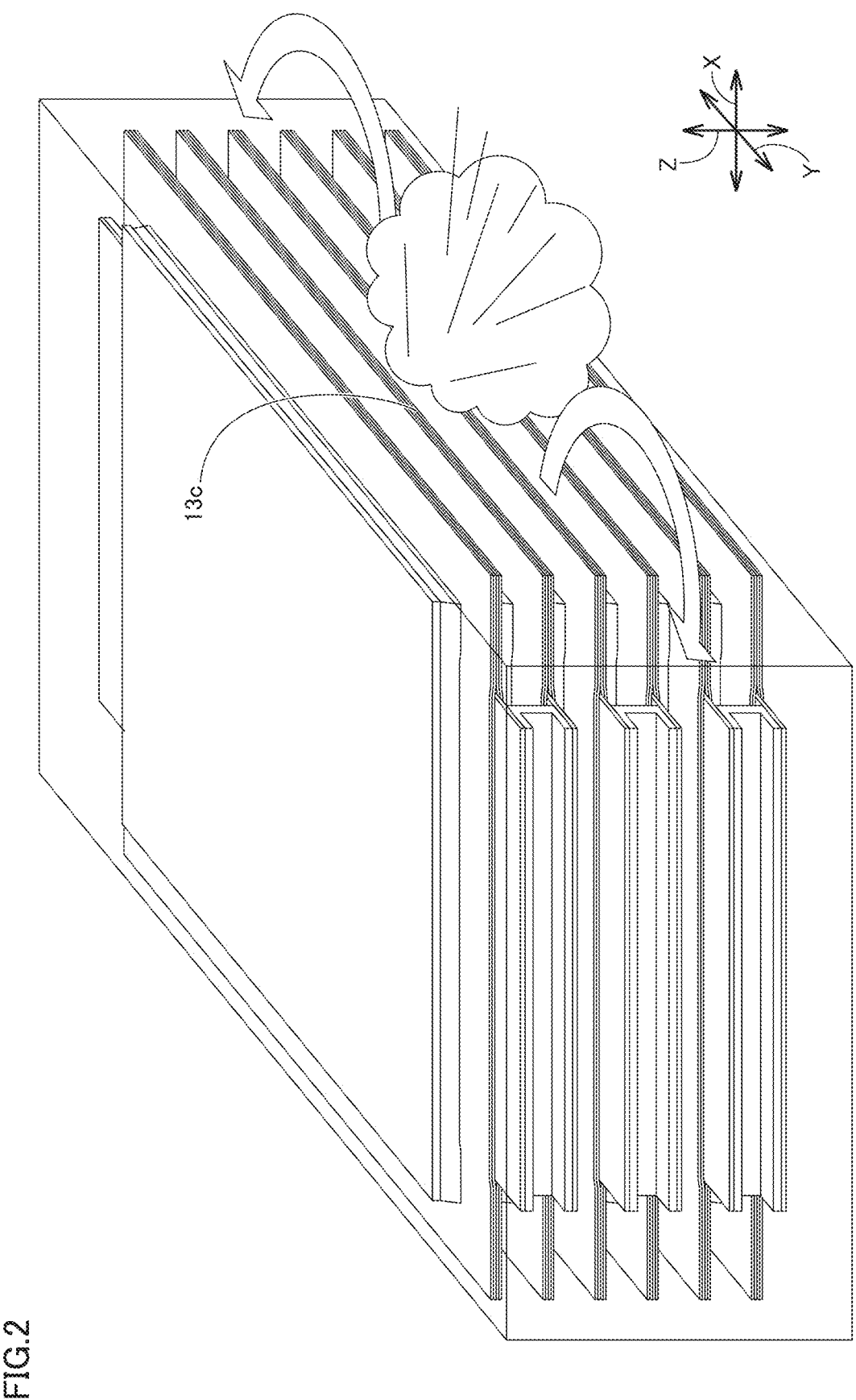
FIG. 2 is a schematic diagram showing a flow of gas when the gas is issued from a third region.
Figure 3:
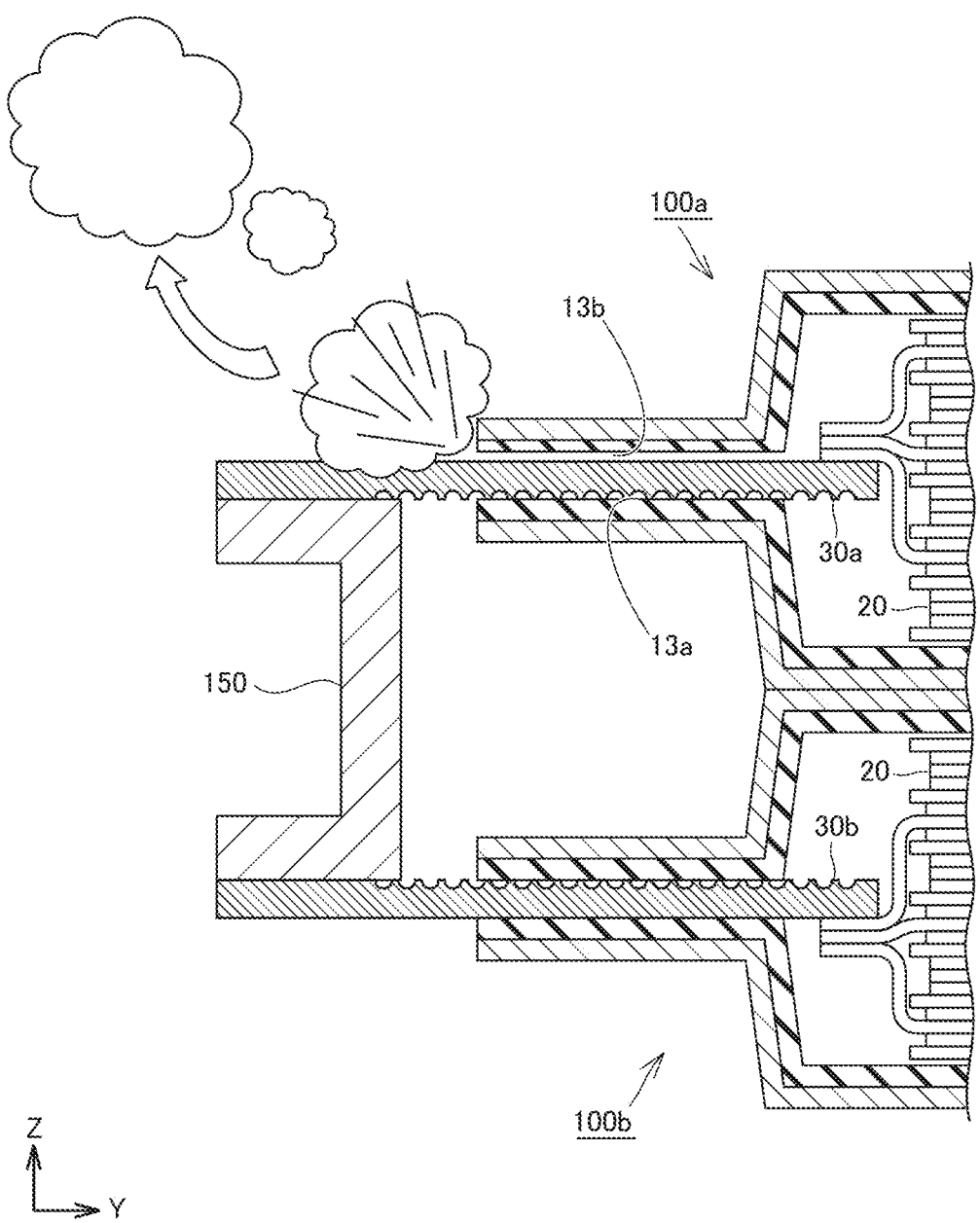
FIG. 3 is a schematic diagram showing a flow of gas when the gas is issued from a second region.

Hereinafter, an embodiment (also referred to as "the present embodiment" in the present specification) of the present technology will be described. It should be noted that the scope of the present technology is not limited by the following description. For example, references to functions and effects in the present specification do not limit the scope of the present technology to such a scope that all the functions and effects are exhibited.

In the present specification, expressions such as "comprise", "include", and "have" as well as their variants (such as "be composed of", "encompass", "involve", "contain", "carry", "support", and "hold") are open-end expressions. Each of the open-end expressions may or may not further include additional element(s) in addition to essential element(s). The expression "consist of" is a closed expression. The expression "consist essentially of" is a semi-closed expression. The semi-closed expression may further include additional element(s) in addition to essential element(s) as long as the object of the present technology is not compromised. For example, a normally conceivable element (such as an inevitable impurity) in the field to which the present technology belongs may be included as an additional element.

In the present specification, each of the words "may" and "can" is used in a permissible sense, i.e., "have a possibility to do", rather than in a mandatory sense, i.e., "must do". In the present specification, singular forms ("a", "an", and "the") may include plural forms as well, unless otherwise stated particularly.

The geometric terms in the present embodiment (for example, the term "parallel" or the like) should not be interpreted in a strict sense. For example, the term "parallel" may be deviated to some extent from the strict definition of the term "parallel". The geometric terms in the present specification can include, for example, a tolerance, an error, and the like in terms of design, operation, manufacturing, and the like. A dimensional relation in each of the figures may not coincide with an actual dimensional relation. In order to facilitate understanding of the present technology, the dimensional relation (length, width, thickness, or the like) in each figure may be changed. Further, part of configurations may be omitted.

In each of the figures, the "stacking direction" corresponds to a Z axis direction.

It should be noted that a relation between the stacking direction and the vertical direction may be any relation. For example, the stacking direction may be parallel to the vertical direction. For example, the stacking direction may be orthogonal to the vertical direction.

In the present specification, numerical ranges such as "95° C. to 140° C." and "95 to 140° C." include the lower and upper limit values unless otherwise stated particularly. That is, each of the expressions "95° C. to 140° C." and "95 to 140° C." represents a numerical range of "more than or equal to 95° C. and less than or equal to 140° C.". Further, numerical values freely selected from a numerical range may be employed as new lower and upper values. For example, a new numerical range may be set by freely combining a numerical value described in the numerical range with a numerical value described in another portion of the present specification.

In the present specification, the expression "when an abnormality occurs" indicates at least one of a time when a temperature is increased and a time when internal pressure is increased. The expression "when a temperature is increased" indicates that a surface temperature of the cell becomes more than or equal to 90° C. The surface temperature of the cell can be measured, for example, by a thermocouple. When the internal pressure is increased, a difference between the internal pressure and the external pressure of the cell is more than or equal to 0.1 MPa. The internal pressure can be measured by an internal pressure measuring instrument.

In the present specification, the "first cell" and the "second cell" may be collectively referred to as "cell".

<Battery Pack>

Figure 4:
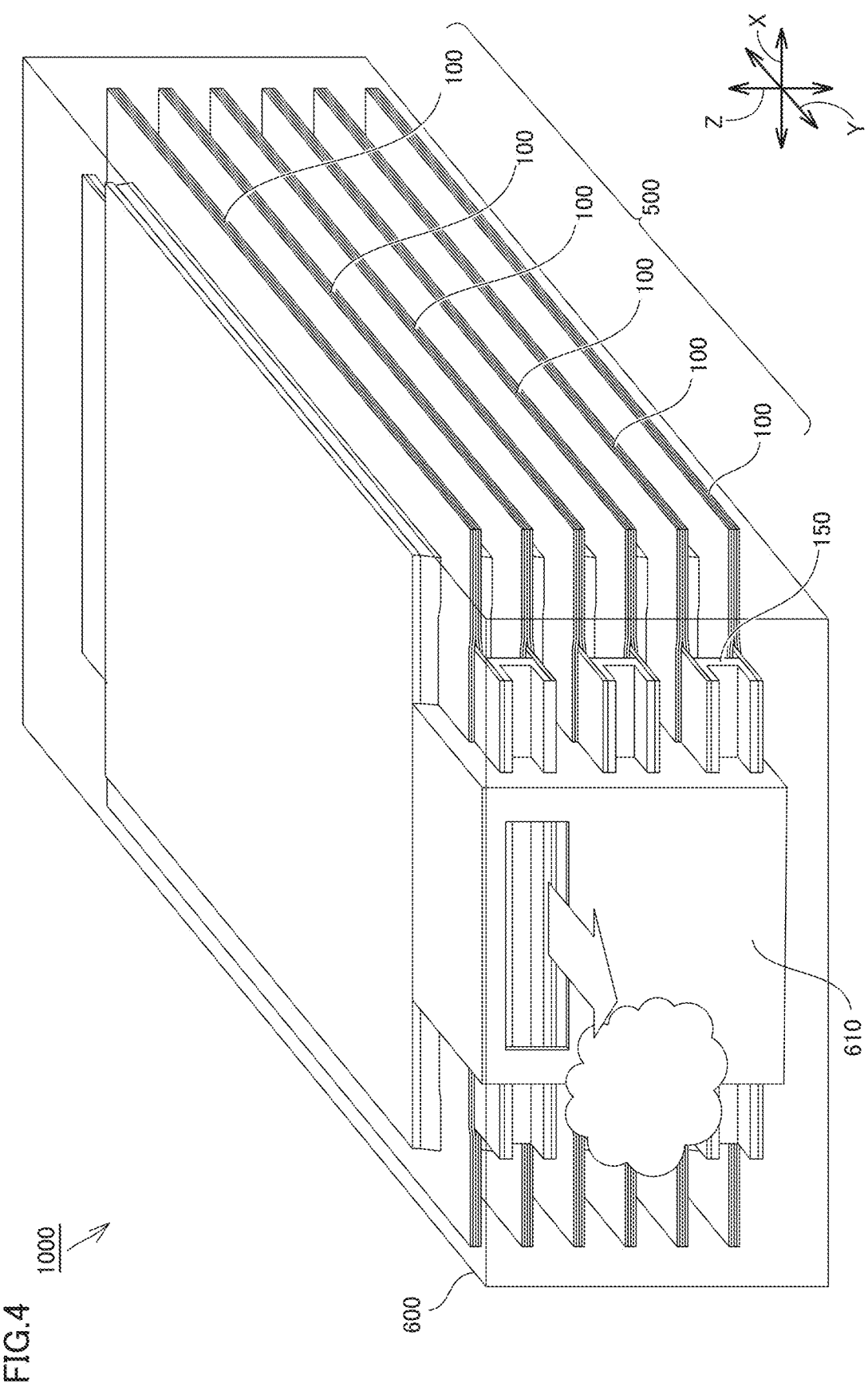
FIG. 4 is a schematic diagram of a battery pack in the present embodiment.

FIG. 4 is a schematic diagram of a battery pack in the present embodiment.

A battery pack 1000 can be used for any purpose of use. Battery pack 1000 may be used as a main power supply or a motive power assisting power supply in an electrically powered vehicle, for example. Battery pack 1000 includes a module 500. Battery pack 1000 may solely include one module 500. Battery pack 1000 may include two or more modules 500. Battery pack 1000 may further include any configuration as long as module 500 is included therein. Battery pack 1000 may further include, for example, a protection circuit, a protection device, a monitoring circuit, a cooling device, or the like.

<<Container>>

Battery pack 1000 may further include a container 600, for example. Container 600 can be also referred to as "housing" or the like. Container 600 stores module 500. Container 600 may store one module 500. Container 600 may store two or more modules 500.

Container 600 may have any outer shape. Container 600 may have a prismatic shape, for example. Container 600 may be composed of a metal or a resin, for example. An exhaust duct 610 may be formed inside container 600. Exhaust duct 610 communicates with outside of container 600. Exhaust duct 610 may include, for example, a straight pipe. Exhaust duct 610 may include, for example, an elbow. Exhaust duct 610 guides, to the outside of container 600, gas issued from module 500. Container 600 may further include a fan, a suction blower, or the like to facilitate exhaust of the gas.

<<Module>>

Figure 5:
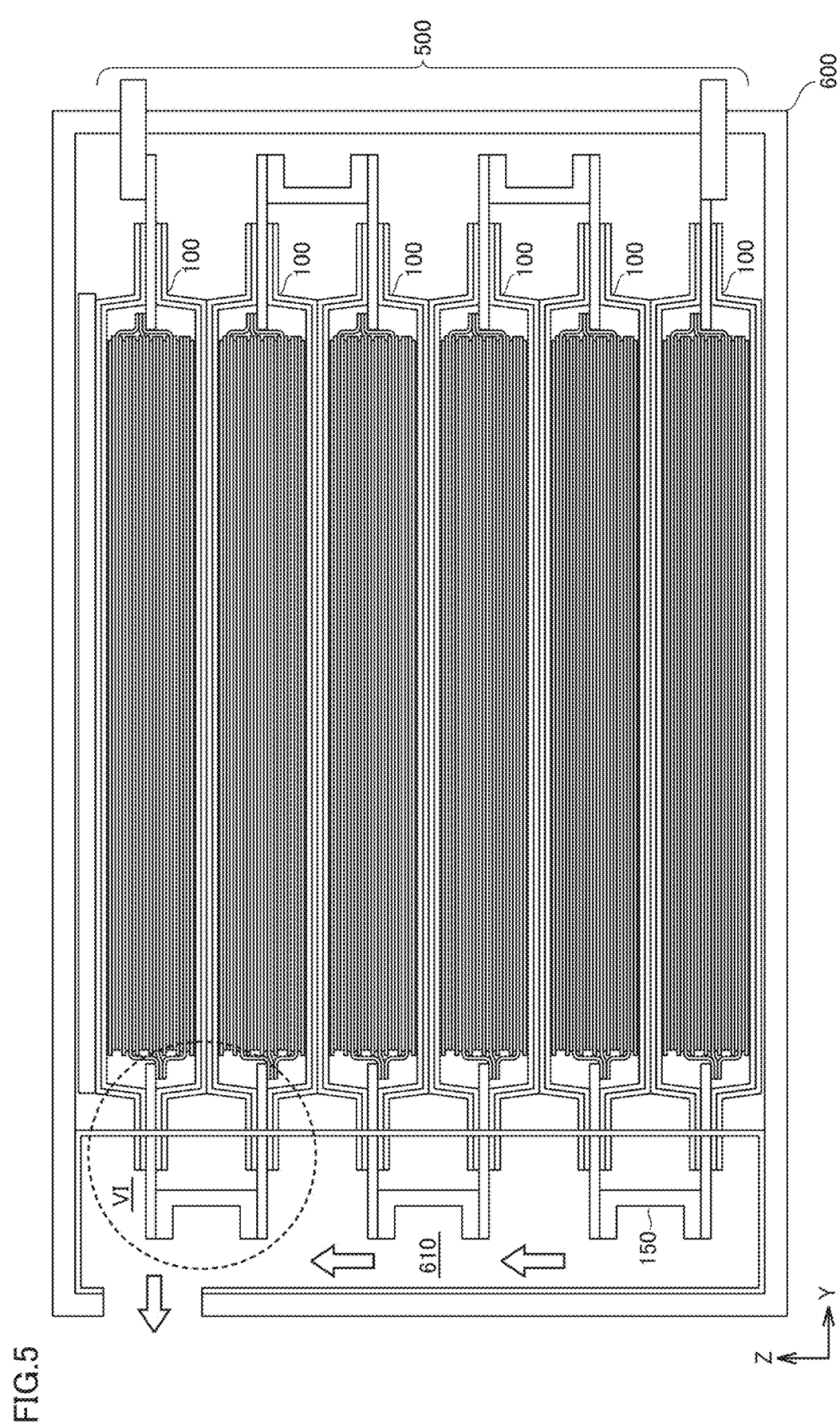
FIG. 5 is a schematic cross sectional view of the battery pack in the present embodiment.

FIG. 5 is a schematic cross sectional view of the battery pack in the present embodiment.

FIG. 5 shows a cross section parallel to a YZ plane of FIG. 4. The cross section of FIG. 5 is parallel to the stacking direction (Z axis direction).

Battery pack 1000 includes module 500. Module 500 is formed by stacking two or more cells 100 (single-cells) in the Z axis direction. Any number of cells 100 may be provided as long as two or more cells 100 are provided. Module 500 may include, for example, 2 to 100 cells 100. Module 500 may include, for example, 4 to 50 cells 100. Module 500 may include, for example, 6 to 10 cells 100.

<<Cell Pair>>

Figure 6:
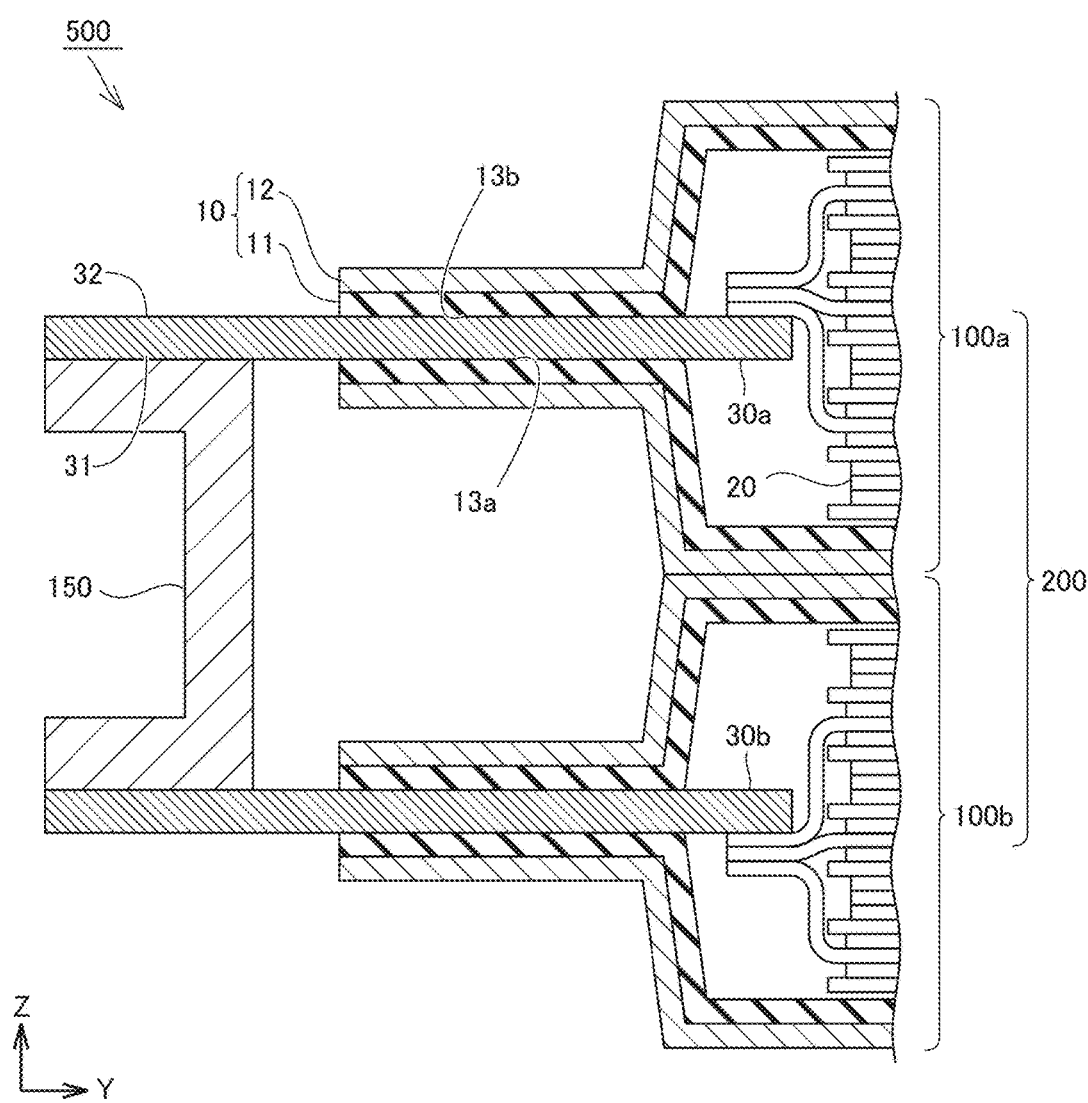
FIG. 6 is an enlarged view of a VI region in FIG. 5.

FIG. 6 is an enlarged view of a VI region in FIG. 5.

Module 500 includes one or more cell pairs 200. Each of cell pairs 200 includes a first cell 100a and a second cell 100b. Second cell 100b is adjacent to first cell 100a. Second cell 100b may be directly connected to first cell 100a. Cell pair 200 may include, for example, a bus bar 150. Bus bar 150 has electric conductivity. Bus bar 150 may connect first cell 100a and second cell 100b to each other.

Electrode terminal 30b may have the same polarity as that of electrode terminal 30a. That is, second cell 100b may be connected to first cell 100a in parallel. Electrode terminal 30b may have a polarity different from that of electrode terminal 30a. That is, second cell 100b may be connected to first cell 100a in series. When cell pair 200 forms a serial circuit, a series of abnormalities tends to be more likely to occur as compared with a case where cell pair 200 forms a parallel circuit. In the present embodiment, even when cell pair 200 forms a series circuit, it is expected that a series of abnormalities are less likely to occur.

Any number of cell pairs 200 may be provided as long as one or more cell pairs 200 are provided. Module 500 may include, for example, 1 to 50 cell pairs 200. Module 500 may include, for example, 2 to 25 cell pairs 200. Module 500 may include, for example, 3 to 5 cell pairs 200.

<<Cell>>

Each of first cell 100a and second cell 100b may independently be any battery system. First cell 100a may be, for example, a liquid-based lithium ion cell, a lithium ion polymer cell, or an all-solid-state lithium ion cell. First cell 100a may have any outer shape. First cell 100a may have, for example, a flat shape. First cell 100a includes an exterior package 10, an electrode assembly 20, and an electrode terminal 30a. Second cell 100b may have substantially the same structure as that of first cell 100a, for example.

(Exterior Package)

Exterior package 10 stores electrode assembly 20. Exterior package 10 may be in the form of a pouch. Exterior package 10 is sealed. Exterior package 10 includes a laminate film. Exterior package 10 may consist essentially of the laminate film, for example. The laminate film includes a resin layer 11 and a metal layer 12.

Resin layer 11 covers metal layer 12. For example, resin layer 11 may be welded to metal layer 12. Resin layer 11 may cover only one surface of metal layer 12. Resin layers 11 may cover both surfaces of metal layer 12. That is, the laminate film may have a two-layer structure (resin layer 11/metal layer 12) or a three-layer structure (resin layer 11/metal layer 12/resin layer 11).

Resin layer 11 may have a thickness of, for example, 1 μm to 100 μm. Resin layer 11 includes a first thermoplastic resin.

Resin layer 11 may consist essentially of the first thermoplastic resin. The first thermoplastic resin may include any component as long as the first thermoplastic resin exhibits thermoplasticity. The first thermoplastic resin may include, for example, at least one selected from a group consisting of polyamide (nylon), polyethylene terephthalate, polyethylene naphthalate, polyphenylene sulfide, phenol resin, polyvinyl alcohol, ethylene vinyl acetate copolymer, polyethylene, polypropylene, polyvinyl chloride, and ionomer. When the laminate film has the three-layer structure, two resin layers 11 may include the same thermoplastic resin or different thermoplastic resins.

Metal layer 12 may have a thickness of, for example, 10 μm to 500 μm. Metal layer 12 includes a metal. Metal layer 12 may consist essentially of the metal, for example. Metal layer 12 may consist essentially of a metal foil, for example. Metal layer 12 may be, for example, a vapor-deposited metal layer. The vapor-deposited metal layer may be formed, for example, by vapor deposition of a metal on a surface of resin layer 11. Metal layer 12 may include, for example, aluminum (Al), an Al alloy, or the like.

(Electrode Assembly)

Electrode assembly 20 includes a positive electrode and a negative electrode. The positive electrode includes a positive electrode active material. The negative electrode includes a negative electrode active material. Each of the positive electrode and the negative electrode may be in the form of a sheet, for example. Electrode assembly 20 may be of a stacked type, for example. That is, electrode assembly 20 may be formed by alternately stacking positive and negative electrodes. Electrode assembly 20 may be of a wound type, for example. That is, electrode assembly 20 may be formed by spirally winding a stack including positive and negative electrodes.

Electrode assembly 20 may further include a separator. The separator is electrically insulative. The separator separates the positive electrode and the negative electrode from each other. The separator may include, for example, a porous film. Electrode assembly 20 may further include an electrolyte. The electrolyte may be a liquid, a gel, or a solid. For example, electrode assembly 20 may be impregnated with a liquid electrolyte (electrolyte solution).

(Electrode Terminal)

First cell 100a includes two electrode terminals 30a. One of two electrode terminals 30a is a positive terminal. The other of two electrode terminals 30a is a negative terminal. Each of electrode terminals 30a is connected to electrode assembly 20. Electrode terminal 30a may be welded to electrode assembly 20. Electrode terminal 30a has a flat plate shape. Electrode terminal 30a may include a metal plate, for example. Electrode terminal 30a may have a thickness of, for example, 0.1 mm to 5 mm. The positive electrode terminal may include an Al plate or the like, for example. The negative electrode terminal may include a copper (Cu) plate or the like, for example.

(Sealing Portion)

Figure 7:
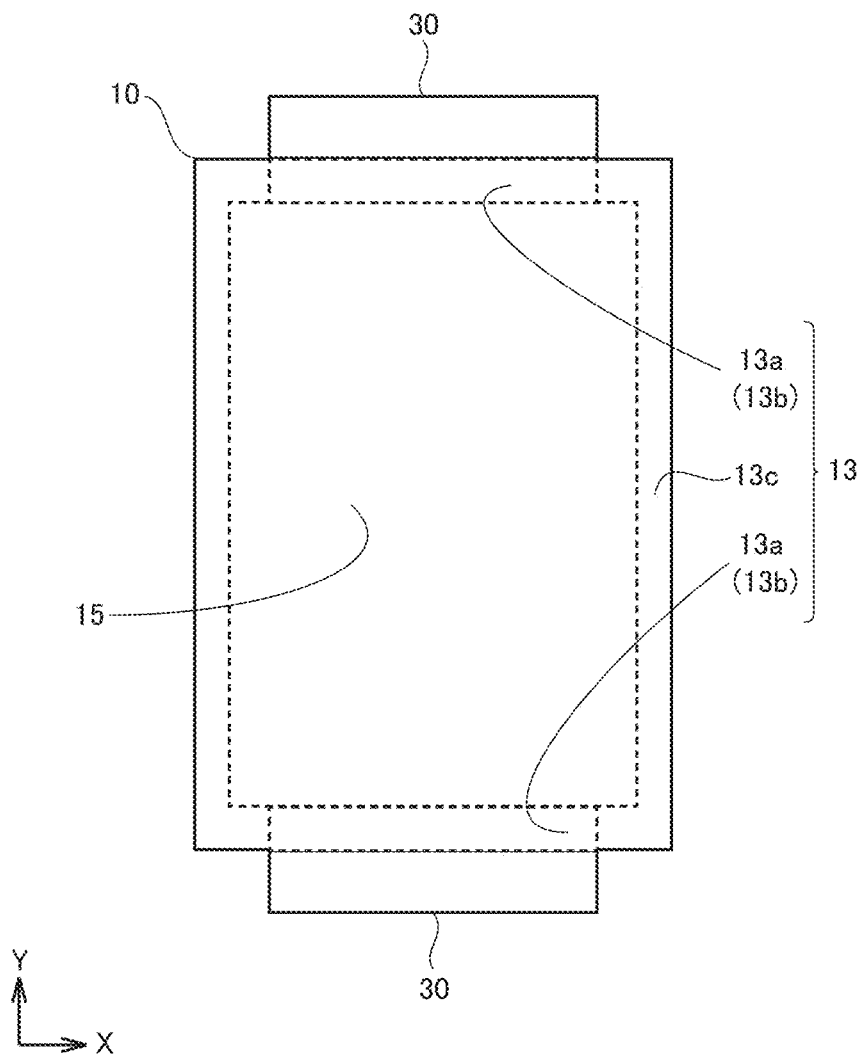
FIG. 7 is a first plan view of a cell in the present embodiment.

FIG. 7 is a first plan view of a cell in the present embodiment.

Exterior package 10 can have any planar shape. Exterior package 10 may have, for example, a quadrangular shape. A sealing portion 13 is formed at a peripheral edge of exterior package 10. Sealing portion 13 is formed by thermal welding. Sealing portion 13 may surround a storage portion 15. Storage portion 15 stores electrode assembly 20.

Sealing portion 13 includes a first region 13a, a second region 13b, and a third region 13c. Third region 13c is formed between portions of resin layer 11 (see FIG. 6). In third region 13c, the portions of resin layer 11 are welded to each other.

Electrode terminal 30 extends through sealing portion 13 and is drawn from inside of exterior package 10 to outside of exterior package 10. First region 13a and second region 13b are formed at positions at which electrode terminal 30 extends through sealing portion 13. In FIG. 7, first region 13a and second region 13b are in such a positional relation that second region 13b is on the front side and first region 13a is on the rear side.

A contour line of exterior package 10 may be constituted of, for example, four sides. Electrode terminals 30 (the positive electrode terminal or the negative electrode terminal) may be respectively disposed on two sides of the four sides facing each other.

Figure 8:
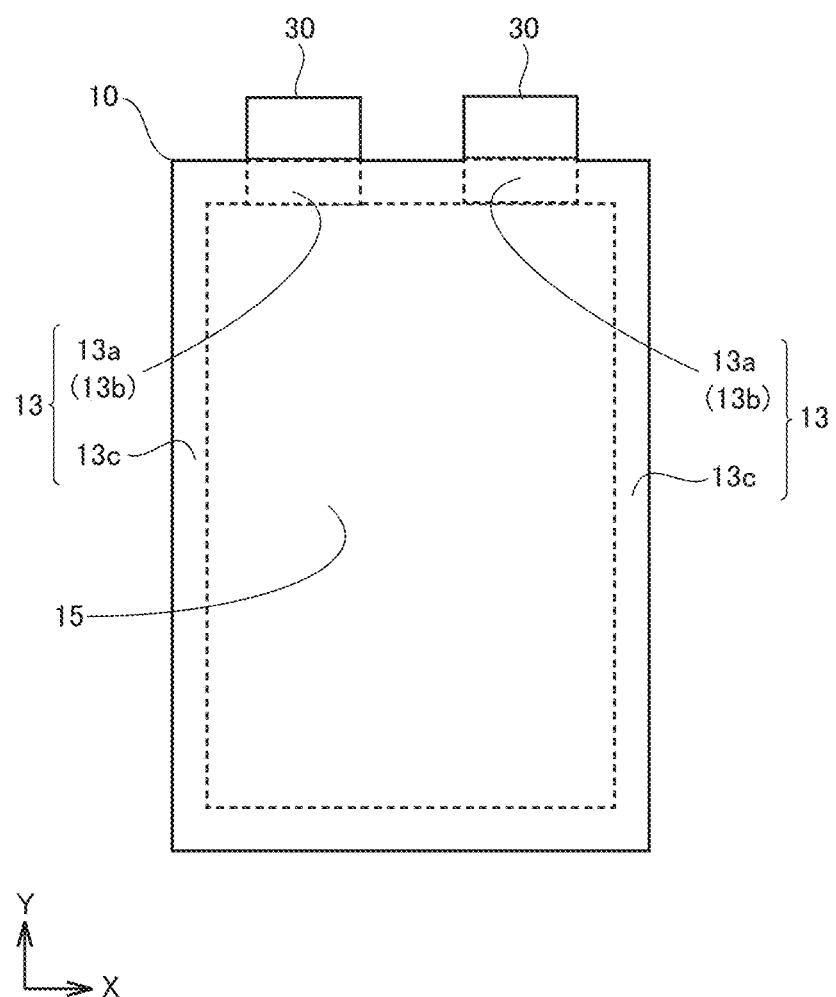
FIG. 8 is a second plan view of the cell in the present embodiment.

FIG. 8 is a second plan view of the cell in the present embodiment.

The contour line of exterior package 10 may be constituted of, for example, four sides. Two electrode terminals 30 (the positive electrode terminal and the negative electrode terminal) may be disposed on one of the four sides.

<<Fracture Promoting Portion>>

Electrode terminal 30a includes a first main surface 31 and a second main surface 32 (see FIG. 6). Second main surface 32 is a surface opposite to first main surface 31. First main surface 31 is oriented in a direction of the adjacent cell (second cell 100b).

First region 13a is formed between first main surface 31 and resin layer 11. In first region 13a, resin layer 11 is welded to first main surface 31. Second region 13b is formed between second main surface 32 and resin layer 11. In second region 13b, resin layer 11 is welded to second main surface 32.

Second region 13b includes a fracture promoting portion. The fracture promoting portion is configured to be more likely to be fractured than first region 13a and third region 13c when an abnormality occurs. The fracture promoting portion may be formed at one of first cell 100a and second cell 100b in cell pair 200, or may be formed at each of both first cell 100a and second cell 100b. That is, in cell pair 200, at least one of first cell 100a and second cell 100b may include the fracture promoting portion.

The fracture promoting portion may be disposed at the entire region of second region 13b. The fracture promoting portion may be disposed at a portion of second region 13b. That is, the fracture promoting portion may be formed at at least a portion of second region 13b.

The fracture promoting portion may extend to communicate the inside of exterior package 10 with the outside of exterior package 10. Since the fracture promoting portion communicates the inside of exterior package 10 with the outside of exterior package 10, a gas flow path is expected to be formed smoothly.

(Rough Surface Portion)

Figure 9:
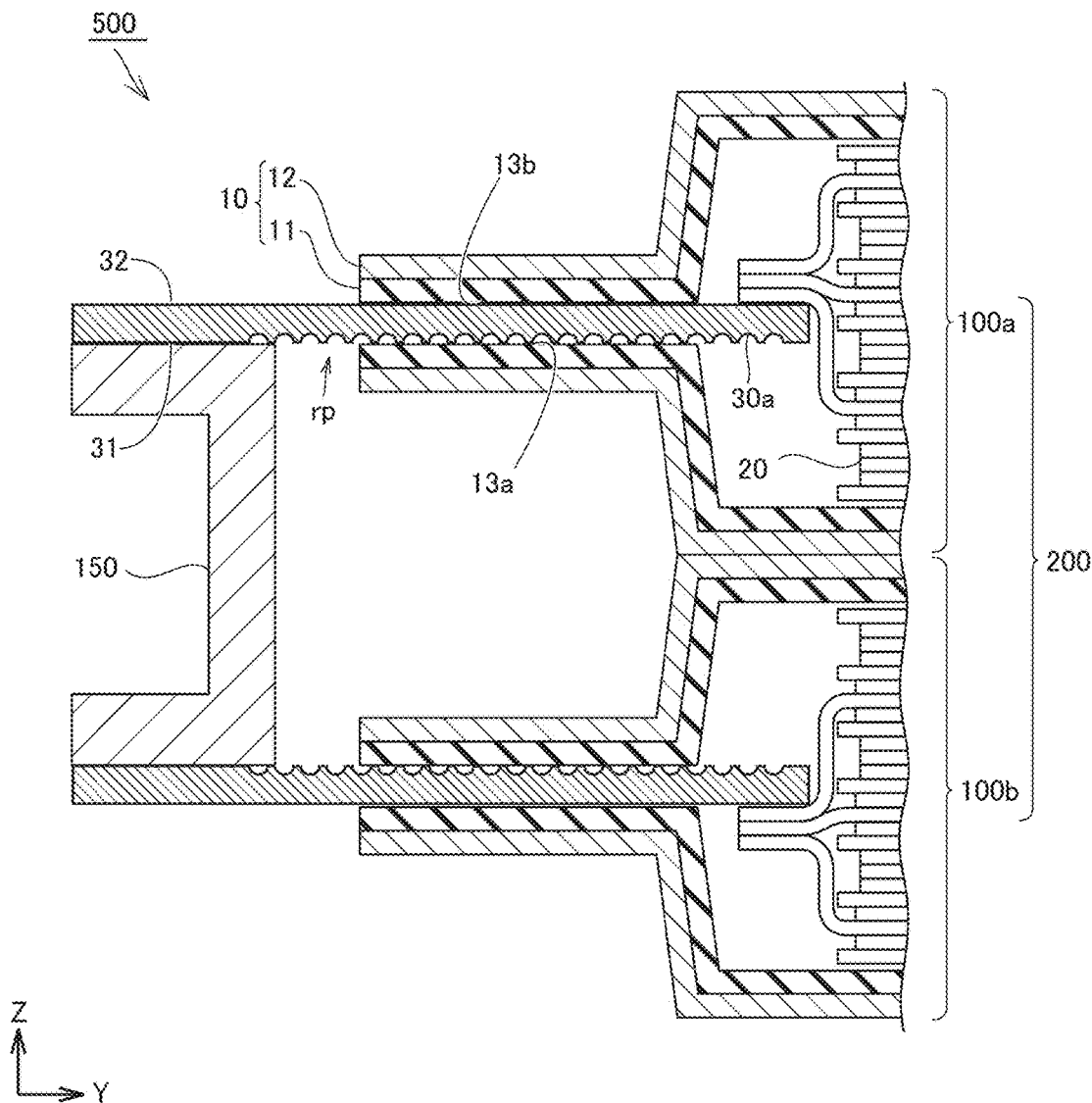
FIG. 9 is a schematic cross sectional view showing a first example of a fracture promoting portion.

FIG. 9 is a schematic cross sectional view showing a first example of the fracture promoting portion.

The fracture promoting portion can have any configuration. For example, first main surface 31 may include a rough surface portion rp. For example, first main surface 31 may consist essentially of rough surface portion rp. Since first main surface 31 includes rough surface portion rp, bonding strength of first region 13a can be increased. That is, second region 13b has a relatively low bonding strength. As a result, the fracture promoting portion can be formed in second region 13b. The fracture promoting portion can be fractured when pressure is increased, for example.

Rough surface portion rp includes irregularities on its surface. Rough surface portion rp can be formed by a blasting process, for example. Rough surface portion rp may have Ra of more than or equal to 0.1 μm, for example. Rough surface portion rp may have Ra of more than or equal to 0.5 μm, for example. Rough surface portion rp may have Ra of less than or equal to 10 μm, for example. In the present specification, "Ra" represents "arithmetic mean roughness" defined in "JIS B 0601". Ra can be measured by a laser microscope.

For example, second main surface 32 may include a smooth surface. For example, second main surface 32 may consist essentially of the smooth surface. The smooth surface may have Ra of less than 0.1 μm, for example. The smooth surface may have Ra of, for example, 0.01 μm to 0.05 m.

For example, each of both first main surface 31 and second main surface 32 may include rough surface portion rp. When each of both first main surface 31 and second main surface 32 include rough surface portion rp, for example, the following relation may be satisfied: "Ra of the first main surface>Ra of the second main surface". For example, first main surface 31 may have Ra that is twice to 100 times as large as that of second main surface 32. For example, first main surface 31 may have Ra that is 5 to 50 times as large as that of second main surface 32.

(Bonding Strength)

Second region 13b may have a bonding strength lower than those of first region 13a and third region 13c, for example. Since second region 13b has such a relatively low bonding strength, the fracture promoting portion can be formed in second region 13b. The fracture promoting portion having the low bonding strength can be fractured when the pressure is increased, for example.

For example, each of first region 13a and third region 13c may independently have a bonding strength of 5 to 10 kgf/15 mm. For example, second region 13b may have a bonding strength of less than 5 kgf/15 mm. For example, second region 13b may have a bonding strength of more than or equal to 1 kgf/15 mm. The "bonding strength" in the present specification refers to "peel strength of bonded assemblies". The "peel strength of bonded assemblies" is measured through "Determination of peel strength of bonded assemblies (180° peel)" in accordance with "JIS K 6854-2". The determination of peel strength of bonded assemblies can be performed using, for example, "Autograph (registered trademark)" manufactured by Shimadzu Corporation. A tensile tester having a function equivalent to that of the foregoing apparatus may be used. A test specimen is prepared. The test specimen is cut out from each region. For example, a test specimen cut out from first region 13a includes a portion of electrode terminal 30a and a portion of exterior package 10 (laminate film). The portion of exterior package 10 is welded to the portion of electrode terminal 30a. An end portion of electrode terminal 30a and an end portion of exterior package 10 are fixed to a grip of the tensile tester. Exterior package 10 is peeled off from electrode terminal 30a at an angle of 180°. The grip is moved at a moving speed of 100 mm/min. From a force-grip movement distance curve, an average peeling force (kgf) is determined. The unit "kgf/15 mm" indicates an average peeling force when the width of the test specimen is 15 mm.

(Low-Melting-Point Resin)

For example, the fracture promoting portion may include a second thermoplastic resin. For example, in second region 13b, resin layer 11 may include the second thermoplastic resin. The second thermoplastic resin has a melting point lower than that of the first thermoplastic resin. The fracture promoting portion including the second thermoplastic resin is expected to be fractured when the temperature is increased, for example. Since internal pressure is released at an early stage when an abnormality occurs, a heat generation reaction may become gradual and an amount of generation of gas may be reduced, for example. Further, heat generation of electrode assembly 20 may become gradual.

In second region 13b, resin layer 11 may include, for example, a mixture of the first thermoplastic resin and the second thermoplastic resin. The mixture may form a homogeneous phase, for example. The mixture may have, for example, a sea-island structure. For example, the first thermoplastic resin may form a sea phase and the second thermoplastic resin may form an island phase. For example, the second thermoplastic resin may form a sea phase and the first thermoplastic resin may form an island phase.

Figure 10:
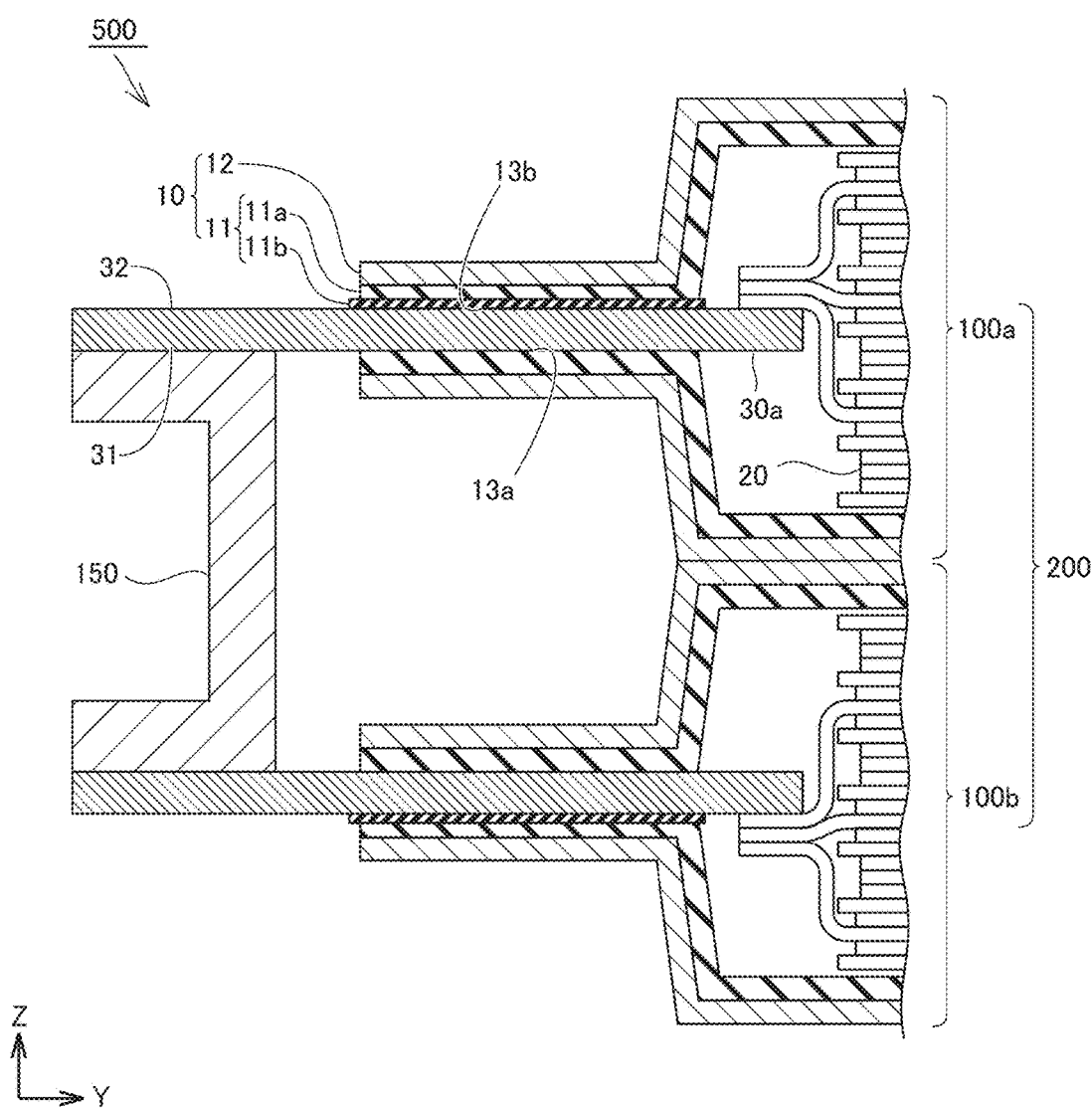
FIG. 10 is a schematic cross sectional view showing a second example of the fracture promoting portion.

FIG. 10 is a schematic cross sectional view showing a second example of the fracture promoting portion.

For example, in second region 13b, resin layer 11 may have a multilayer structure. That is, resin layer 11 may include a first layer 11a and a second layer 11b. Second layer 11b is interposed between second main surface 32 and first layer 11a. Second layer 11b may extend to communicate the inside of exterior package 10 with the outside of exterior package 10. For example, first layer 11a may include the first thermoplastic resin. First layer 11a may consist essentially of the first thermoplastic resin. For example, second layer 11b may include the second thermoplastic resin. Second layer 11b may consist essentially of the second thermoplastic resin.

The second thermoplastic resin may include any component as long as the second thermoplastic resin has a melting point lower than that of the first thermoplastic resin. The second thermoplastic resin may include, for example, at least one selected from a group consisting of polyethylene (melting point: 95 to 140° C.), polypropylene (melting point: 160 to 170° C.), and polyvinyl chloride (melting point: 180° C.). In the present specification, the "melting point" of the thermoplastic resin indicates the peak top temperature of the melting peak (endothermic peak) in a DSC (Differential Scanning calorimetry) curve. The DSC curve can be measured in accordance with "JIS K 7121".

Figure 11:
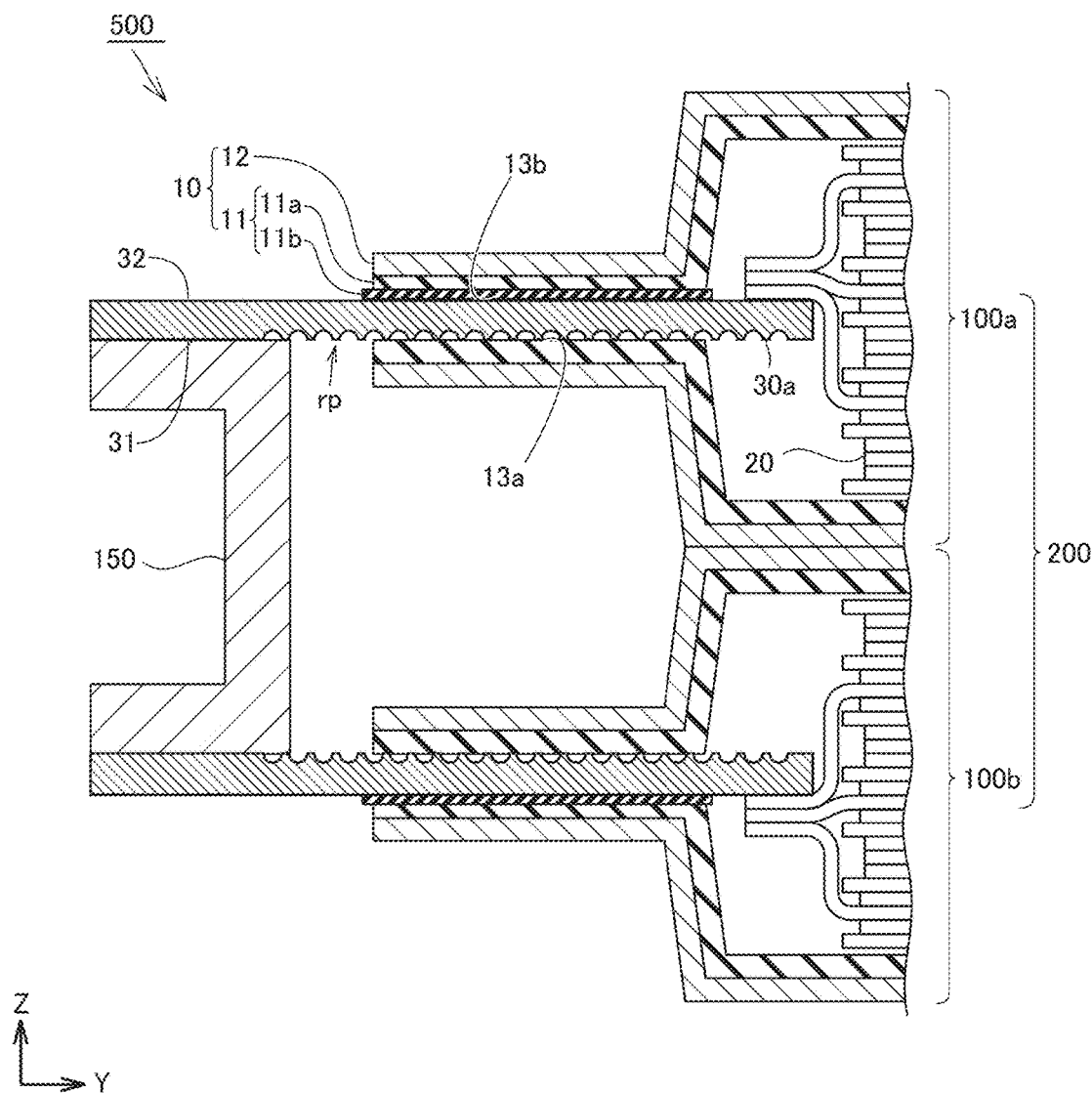
FIG. 11 is a schematic cross sectional view showing a third example of the fracture promoting portion.

FIG. 11 is a schematic cross sectional view showing a third example of the fracture promoting portion.

For example, the fracture promoting portion may be formed by one of rough surface portion rp or the low-melting-point resin (second thermoplastic resin). For example, the fracture promoting portion may be formed by combining rough surface portion rp with the low-melting-point resin. For example, first main surface 31 may include rough surface portion rp. Moreover, resin layer 11 disposed on the second main surface 32 side may include first layer 11a and second layer 11b. Second layer 11b may include the second thermoplastic resin.

<<Arrangement of Fracture Promoting Portions>>

Figure 12:
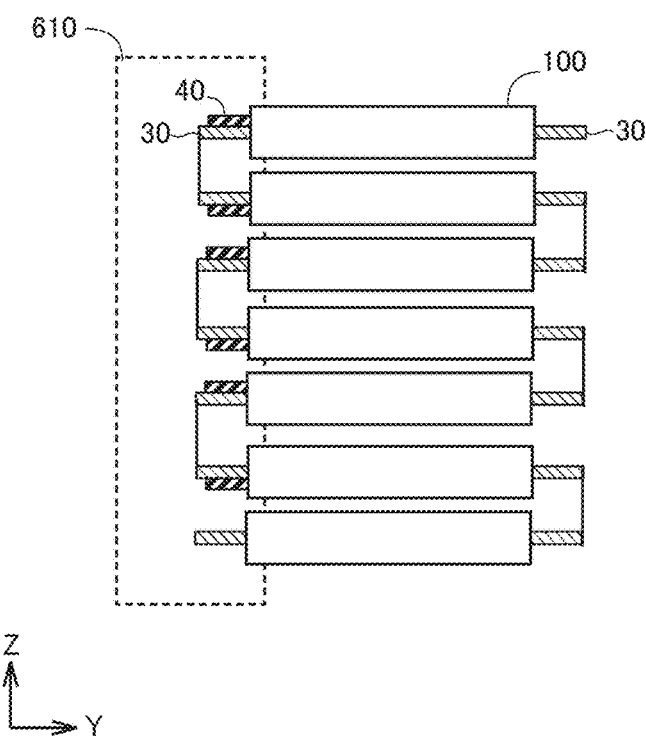
FIG. 12 is a conceptual diagram showing a first example of an arrangement of fracture promoting portions.

FIG. 12 is a conceptual diagram showing a first example of an arrangement of fracture promoting portions.

In each cell 100, two electrode terminals 30 may be drawn on different sides in a direction (Y axis direction) intersecting the stacking direction (Z axis direction). For example, all the fracture promoting portions 40 may be located on one side in the Y axis direction. Since all the fracture promoting portions 40 are located on one side, all the fracture promoting portions 40 can be readily disposed inside exhaust duct 610. That is, exhaust duct 610 can have a simple structure.

Figure 13:
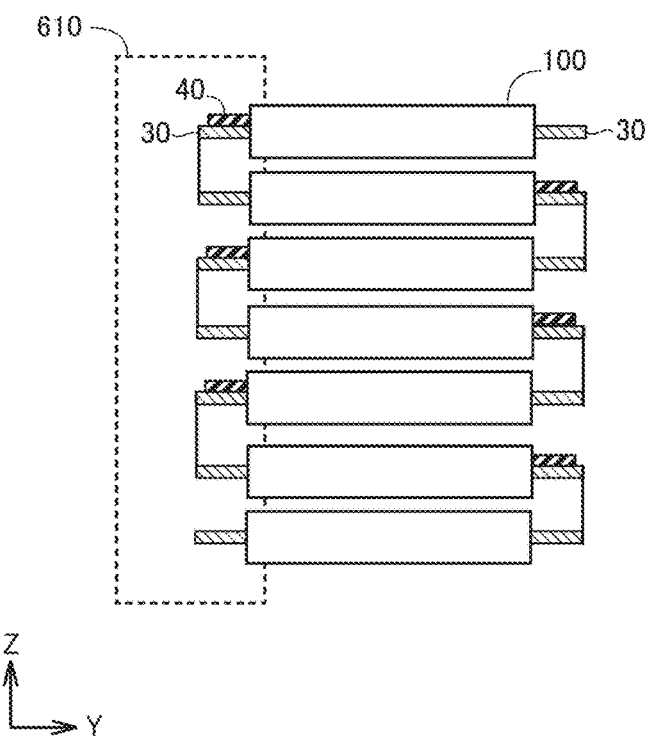
FIG. 13 is a conceptual diagram showing a second example of the arrangement of the fracture promoting portions.

FIG. 13 is a conceptual diagram showing a second example of the arrangement of the fracture promoting portions.

Fracture promoting portions 40 may be disposed on both sides in the Y axis direction. Exhaust duct 610 may be provided on only one side in the Y axis direction, or may be provided on each of the both sides in the Y axis direction. All the fracture promoting portions 40 may be disposed inside exhaust duct 610. Part of fracture promoting portions 40 may be disposed outside exhaust duct 610.

Figure 14:
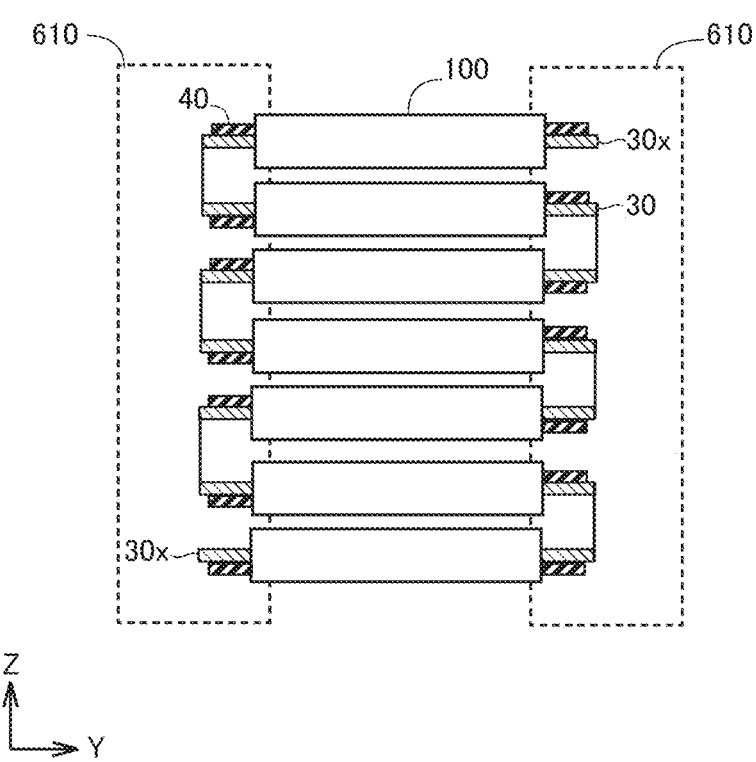
FIG. 14 is a conceptual diagram showing a third example of the arrangement of the fracture promoting portions.

FIG. 14 is a conceptual diagram showing a third example of the arrangement of the fracture promoting portions.

For example, fracture promoting portions 40 may be disposed between all the electrode terminals 30 and the laminate films.

It should be noted that an electrode terminal 30x located at an end in the stacking direction does not have a target (cell) to which electrode terminal 30x is connected. At the end in the stacking direction, fracture promoting portion 40 may be disposed on the side on which no adjacent cell is present, for example. At the end in the stacking direction, fracture promoting portion 40 may be disposed on the side on which an adjacent cell is present. At the end in the stacking direction, no fracture promoting portion 40 may be disposed.

EXAMPLES

Hereinafter, an example of the present technology (also referred to as "present example" in the present specification) will be described. However, the following description does not limit the scope of the present technology.
<Preparation of Samples>

Figure 15:
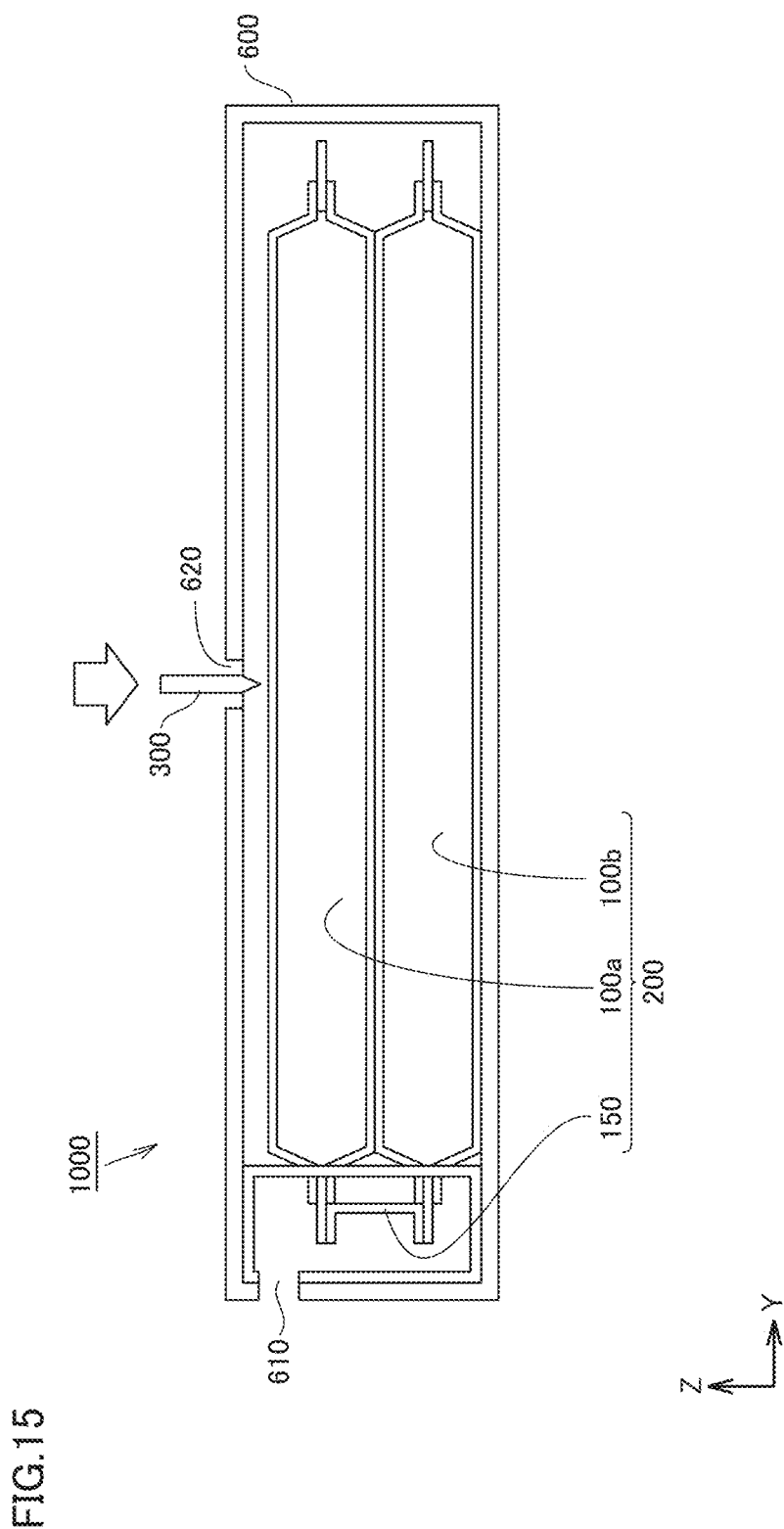
FIG. 15 is a schematic cross sectional view showing each sample.

FIG. 15 is a schematic cross sectional view showing each sample.

A battery pack 1000 as a sample includes a container 600. Container 600 is composed of Al. An exhaust duct 610 is provided inside container 600. An insertion hole 620 is formed in container 600. Insertion hole 620 has a diameter of 1.2 mm.

A module is disposed in container 600. The module consists of one cell pair 200. Cell pair 200 includes a first cell 100a, a second cell 100b, and a bus bar 150. Cell pair 200 forms a series circuit. Bus bar 150 connects first cell 100a and second cell 100b to each other in series. Each of first cell 100a and second cell 100b is a liquid-based lithium ion cell. An exterior package is composed of an Al laminate film. The exterior package is sealed by thermal welding. The exterior package stores an electrode assembly. The electrode assembly is of a stacked type. The positive electrode terminal is an Al plate. The negative electrode terminal is a Cu plate. A rough surface portion is formed on at least one of the positive electrode terminal and the negative electrode terminal by a blasting process.
<Test Method>

A nail 300 is prepared. Nail 300 is a round nail (body diameter: 1.0 mm). Nail 300 is inserted through insertion hole 620. Further, nail 300 is inserted into first cell 100a. The insertion of nail 300 causes an internal short circuit in first cell 100a. After gas is issued from first cell 100a, the surface temperature of second cell 100b is measured for 30 minutes.
<<No. 1>>

FIG. 16 shows a configuration of each sample and a result of nail penetration test.

In battery pack 1000 of No. 1, rough surface portion rp of electrode terminal 30a and rough surface portion rp of electrode terminal 30b are disposed to face each other. That is, in battery pack 1000 of No. 1, second region 13b includes fracture promoting portion 40.
<<No. 2>>

In battery pack 1000 of No. 2, no rough surface portion rp is formed on each of both electrode terminal 30a and electrode terminal 30b. That is, battery pack 1000 of No. 2 includes no fracture promoting portion 40. This is because there is no substantial difference in bonding strength among all the surfaces.
<<No. 3>>

In battery pack 1000 of No. 3, rough surface portion rp of electrode terminal 30a and rough surface portion rp of electrode terminal 30b are disposed to be oriented in opposite directions. That is, in battery pack 1000 of No. 3, first region 13a includes fracture promoting portion 40.
<<No. 4>>

In battery pack 1000 of No. 4, rough surface portion rp is formed on each of all the surfaces of electrode terminal 30a and electrode terminal 30b. Therefore, battery pack 1000 of No. 4 includes no fracture promoting portion 40. This is because there is no substantial difference in bonding strength among all the surfaces.
<Results>

In FIG. 16, "OCCURRED" in the item "SERIES OF HEAT GENERATION EVENTS" indicates that the surface temperature of second cell 100b was increased to be more than or equal to 90° C. after gas was issued from first cell 100a. "NOT OCCURRED" indicates that the surface temperature of second cell 100b was less than 90° C. for 30 minutes after gas was issued from first cell 100a.

In FIG. 16, it is observed that when second region 13b includes fracture promoting portion 40, the abnormality having occurred tends to be less likely to cause another abnormality in second cell 100b.

The present embodiment and the present examples are illustrative in any respects. The present embodiment and the present examples are not restrictive. The scope of the present technology includes any modifications within the scope and meaning equivalent to the terms of the claims. For example, it is initially expected to extract freely configurations from the present embodiment and the present examples and combine them freely.

What is claimed is:
1. A battery pack, comprising:
a module, and
a container storing the module, wherein
the module includes one or more cell pairs;
each of the one or more cell pairs includes a first cell and a second cell,
the second cell is adjacent to the first cell,
the second cell is electrically connected to the first cell,
the first cell includes an exterior package, an electrode assembly, and an electrode terminal,
the exterior package includes a laminate film,
the laminate film includes a resin layer and a metal layer,
the resin layer covers the metal layer,
the resin layer includes a first thermoplastic resin,
the exterior package includes a storage portion storing the electrode assembly,
a sealing portion is formed at a peripheral edge of the exterior package,
the electrode terminal is connected to the electrode assembly,
the electrode terminal extends through the sealing portion and is drawn from inside of the exterior package to outside of the exterior package, the electrode terminal has a flat plate shape,
the electrode terminal includes a first main surface and a second main surface,
the first main surface is oriented in a direction of the second cell,
the second main surface is a surface opposite to the first main surface,
the sealing portion includes a first region, a second region, and a third region,
the first region is formed between the first main surface and the resin layer,
the second region is formed between the second main surface and the resin layer,
the third region is formed between portions of the resin layer,
the second region includes a fracture promoting portion,
the fracture promoting portion is configured to, in response to at least one of temperature or internal pressure of the first cell increasing, be more likely to be fractured than the first region and the third region,
the electrode terminal is configured to, after the fracture promoting portion is fractured, maintain an electrical connection with the electrode assembly,
the battery pack is configured not to allow gas from the fracture promoting portion to flow to the storage portion of the second cell,
an exhaust duct is formed inside the container,
the fracture promoting portion is disposed inside the exhaust duct, and
the storage portion is disposed outside the exhaust duct.

2. The battery pack according to claim 1, wherein the first main surface includes a rough surface portion.

3. The battery pack according to claim 1, wherein the fracture promoting portion includes a second thermoplastic resin, and
the second thermoplastic resin has a melting point lower than a melting point of the first thermoplastic resin.

4. The battery pack according to claim 1, wherein the module includes a plurality of cell pairs including the one or more cell pairs, and
in each of the plurality of cell pairs, the fracture promoting portion is disposed inside the exhaust duct.

5. The battery pack according to claim 1, wherein the first main surface includes a rough surface portion,
the laminate film and the electrode terminal are welded to each other at the first region between the rough surface portion of the main surface and the resin layer,
the laminate film and the electrode terminal are welded to each other at the second region between the second main surface and the resin layer, and
the fracture promoting portion is defined by a bonding strength of the second region being lower than that of the first region.

6. The battery pack according to claim 1, wherein the resin layer comprises
a first layer including the first thermoplastic resin, and
a second layer interposed between and directly contacting the second main surface and the first layer, the second layer including a second thermoplastic resin having a melting point lower than that of the first thermoplastic resin, and
the fracture promoting portion is defined by the second layer.

7. The battery pack according to claim 1, wherein the first main surface includes a rough surface portion,
the laminate film and the electrode terminal are welded to each other at the first region between the rough surface portion of the main surface and the resin layer,
the laminate film and the electrode terminal are welded to each other at the second region between the second main surface and the resin layer,
a bonding strength of the second region is lower than that of the first region,
the resin layer comprises
a first layer including the first thermoplastic resin, and
a second layer interposed between and directly contacting the second main surface and the first layer, the second layer including a second thermoplastic resin having a melting point lower than that of the first thermoplastic resin, and
the fracture promoting portion is defined by (i) the bonding strength of the second region being lower than that of the first region and (ii) the second layer.

8. The battery pack according to claim 5, wherein the exhaust duct communicates with outside of the container.

9. The battery pack according to claim 8, wherein the module includes a plurality of cell pairs including the one or more cell pairs, and
in each of the plurality of cell pairs, the fracture promoting portion is disposed inside the exhaust duct.

10. The battery pack according to claim 6, wherein the exhaust duct communicates with outside of the container.

11. The battery pack according to claim 10, wherein the module includes a plurality of cell pairs including the one or more cell pairs, and
in each of the plurality of cell pairs, the fracture promoting portion is disposed inside the exhaust duct.

12. The battery pack according to claim 7, wherein the exhaust duct communicates with outside of the container.

13. The battery pack according to claim 12, wherein the module includes a plurality of cell pairs including the one or more cell pairs, and
in each of the plurality of cell pairs, the fracture promoting portion is disposed inside the exhaust duct.

14. The battery pack according to claim 1, wherein the electrode terminal directly contacts the electrode assembly.

15. The battery pack according to claim 1, wherein the fracture promoting portion is electrically insulated from the electrical connection between the electrode terminal and the electrode assembly.

16. The battery pack according to claim 1, wherein the second cell comprises an electrode terminal connected to the electrode terminal of the first cell, and
the module further includes a third cell arranged adjacent to the first cell and on a side opposite to the second cell, the third cell including an electrode terminal not directly connected to the electrode terminal of the first cell.

17. The battery pack according to claim 16, further comprising:
a U-shape bus bar physically and electrically connecting the first main surface of the electrode terminal of the first cell and a surface of the electrode terminal of the second cell, the surface of the electrode terminal of the second cell facing the first main surface.

18. The battery pack according to claim 1, wherein the second region includes the fracture promoting portion directly contacting the second main surface and the resin layer.

* * * * *